EXTERNAL MEMORY DEVICE FOR ELECTRONIC DIGITAL COMPUTERS

Filed Aug. 28, 1948 7 Sheets-Sheet 1

ARTHUR W. TYLER
RUSSELL D. O'NEAL
INVENTORS

BY [signatures]
ATTORNEYS

EXTERNAL MEMORY DEVICE FOR ELECTRONIC DIGITAL COMPUTERS

Filed Aug. 28, 1948 7 Sheets-Sheet 2

ARTHUR W. TYLER
RUSSELL D. O'NEAL
INVENTORS
BY
ATTORNEYS

EXTERNAL MEMORY DEVICE FOR ELECTRONIC DIGITAL COMPUTERS

ARTHUR W. TYLER
RUSSELL D. O'NEAL
INVENTORS
BY
ATTORNEYS

ARTHUR W. TYLER
RUSSELL D. O'NEAL
INVENTORS
BY Newton M. Perrins
Zolla N. Carter
ATTORNEYS

EXTERNAL MEMORY DEVICE FOR ELECTRONIC DIGITAL COMPUTERS

ARTHUR W. TYLER
RUSSELL D. O'NEAL
INVENTORS
BY [signature]
ATTORNEYS

EXTERNAL MEMORY DEVICE FOR ELECTRONIC DIGITAL COMPUTERS

Filed Aug. 28, 1948 7 Sheets-Sheet 6

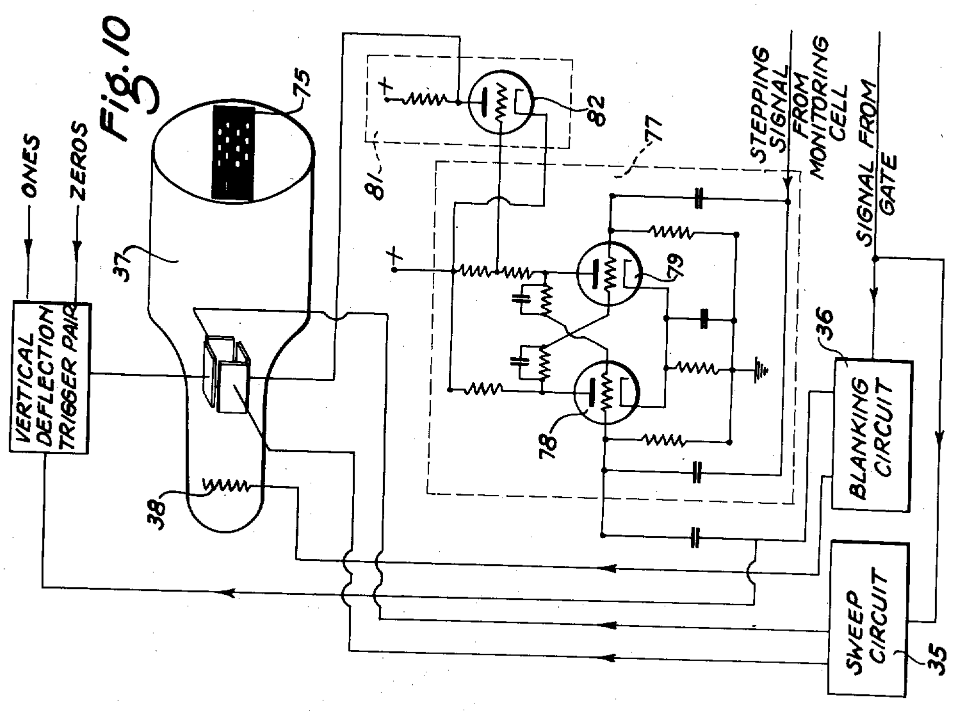

Fig. 10

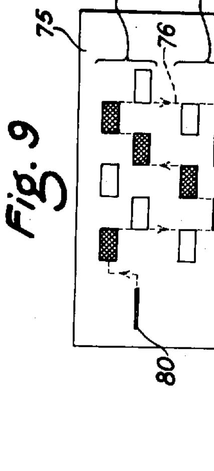

Fig. 9

CATHODE RAY TUBE MASK FOR SINGLE SWEEP RECORDINGS. THE CROSS-HATCHED AREAS INDICATE THE ILLUMINATED SPOTS FOR THE WORD 100110 AND THE BROKEN LINE INDICATES THE PATH OF THE BEAM.

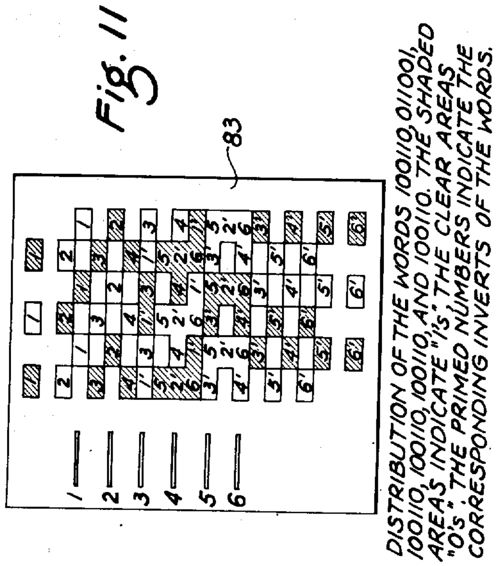

Fig. 11

DISTRIBUTION OF THE WORDS 100110, 011001, 100110, 100110, 100110, AND 100110. THE SHADED AREAS INDICATE "1'S", THE CLEAR AREAS "0'S". THE PRIMED NUMBERS INDICATE THE CORRESPONDING INVERTS OF THE WORDS.

ARTHUR W. TYLER
RUSSELL D. O'NEAL
INVENTORS
BY
ATTORNEYS

CATHODE RAY TUBE MASK FOR TWO SWEEP RECORDING. THE CROSS-HATCHED AREAS INDICATE THE ILLUMINATED SPOTS FOR THE WORD 101110.

DISTRIBUTION OF THE WORDS 101110, 010001, 101110, 101110, AND 101110. THE SHADED AREAS INDICATE "1's", THE CLEAR AREAS "0's". THE PRIMED NUMBERS INDICATE THE CORRESPONDING INVERTS OF THE WORDS.

ARTHUR W. TYLER
RUSSELL D. O'NEAL
INVENTORS

BY [signature]
[signature]
ATTORNEYS atented May 13, 1952

2,596,741

UNITED STATES PATENT OFFICE 2,596,741

EXTERNAL MEMORY DEVICE FOR ELECTRONIC DIGITAL COMPUTERS

Arthur W. Tyler and Russell D. O'Neal, Rochester, N. Y., assignors to Eastman Kodak Company, Rochester, N. Y., a corporation of New Jersey Application August 28, 1948, Serial No. 46,656

4 Claims. (Cl. 346—33)

This invention relates generally to computa- ›nal aids and more particularly to the storage numerical and other information capable of ing represented in what is essentially binary rm. The invention will find its primary use an external memory device for high-speed ;ital computing machines which, under appro- iate orders in the programming of the ma- lnes, will step off digits in serial fashion to the ›mory device.

All practical large-scale, high-speed digital nputing machines require large capacity, aux- ıry memory or storage devices, and standard :hniques have been developed for transferring ta in the form of electrical signals to the stor- e device. Such transfer of data to the storage rice takes place under the control of the com- ter which signals when the transfer is to begin d then supplies in proper order the data to be nsferred until the transfer operation is com- ted. The starting and stopping signals are nished by the computing machine in accord- :e with its control code and are of no direct ıcern to the memory device of the present ention.

:he well-known attributes of a good storage 'ice include: a speed of accepting and storing ich is comparable to the speed of the computer h which it is used; an extreme reliability ich can easily be checked; and a permanent, ıpact record from which the stored informa- ı can reliably be transferred for future use.

.mong the objects of the invention is the pro- on of a large-capacity storage device which . accept digital data in the form of electrical ıals and photographically record these data ably, compactly, and in available form.

nother object of the invention is the pro- on of a storage device which will accept and ›rd data at a speed comparable to the oper- ıg speed of automatic-sequence electronic dig- computing machines.

nother object of the invention is the provision , recording device which will record one dig- aggregate, or word, or many thousands, de- ding upon the receipt of a stop-recording .al.

:ill another object of the invention is to pro- an arrangement wherein a cathode ray tube ıslates incoming serial signals into appro- te light patterns to be photographed.

further object of the invention is the pro- ›n, in a recording device for serially presented :al signals, of means for generating a return al representative of each digit as recorded, reby checking is facilitated.

:her objects of the invention will become ent from the detailed description below when in connection with the accompanying /ings.

All data to be recorded in the memory device, as well as the orders that cause the recorder to carry out the recording process, are furnished in the form of electrical signals from a data source, which may be a computer, a manual keyboard, or some other source of digital data.

There are three general types of operation which are required of the recorder and which the recorder of the invention can accomplish:

(I) When the data source has several units of data to record, it will transfer one of these units in the form of electrical signals to the data-dispensing device. This unit of data shall hereinafter be called a line of data or a word. The data-dispensing device may consist of at least one storage register which maintains the digits stored therein by some static or dynamic electrical means, such as by electrostatic storage tubes or trigger pairs, both well known to the art. This storage register must have the properties (*a*) of being able to accept the electrical signals from the data source, and (*b*) of being able to shift the entire line of data one digital place when an appropriate signal is furnished by the recorder. Also, the digit which is stepped out of the register must be available in the form of an electrical signal which can be furnished to the recorder. Other features of the data-dispensing device which are necessary for checking will be described below.

At the same time that a line of data is transferred to the data-dispensing device or immediately thereafter, an electrical signal is sent from the data source to the recorder to start the film in motion. As soon as the film is in the proper position to accept the line of data, it will be recorded as described in detail below. The actual recording process will be completed so as to leave ample time for the transfer of another line of data from the data source to the data-dispensing device before the film has advanced far enough to be ready for recording the next line. As soon as the film is in position for accepting the second line, it will be recorded. This process will continue until the data source has no more data to record. Then an order in the form of an electrical signal will be sent to the recorder to stop the film. In this type of operation, the film moves continuously during the recording of a group of lines and the lines are spaced uniformly and compactly on the film. This is the type of operation which one might have when recording the output results of a computing machine. The recorder would not necessarily be started every time the computer worked out a result, but instead, results would be stored temporarily until a group was available for recording. Indeed, since results will not normally come at a uniform rate, it will likely be wise in some instances to have a buffer storage in the computer. When the number of lines of data stored in the computer exceed some number $n_1$, the start signal is sent from the data source to the recorder. Recording could then continue until the number of lines of data in this buffer storage is reduced to some number $n_2$, at which time a stop signal is sent from the data source to the recorder. The number $n_2$ would be equal to or greater than 0 but less than $n_1$.

(II) When the data source has only one line of data to record at a time, such as is the case for a manual keyboard, the line of data will first be transferred in the form of electrical signals to the data-dispensing device. An electrical signal will then be sent to the recorder to start the film in motion. As soon as the film has moved into position for recording a line, the recording takes place and the film automatically stops. The next line of data is transferred from the data source into the data-dispensing device and then another signal is sent to the recorder to advance the film for recording this second line. This line-by-line recording is, of course, much slower than the continuous recording described in (I) above. However, the speed is adequate for such uses as preparing and storing the initial data and orders which are to be furnished to a computing machine for the solving of problems.

(III) When the data source is furnishing lines of data at a high and fairly uniform rate, the film in the recorder may run at a uniform speed such that the lines of data as recorded on the film will not overlap even for the highest rate of output from the data source. As soon as a line of data is transferred from the data source to the data dispenser, the actual recording process takes place. In this type of operation, the lines of data are not necessarily stored as uniformly and as compactly as in methods (I) and (II) above. However, this type of operation is inherently capable of higher recording rates and can be useful for recording such information as telemeter data in digital form.

In all three methods of operation, the information is stored essentially in binary form (well known to the art) as clear and opaque spots on the film. A clear spot may represent either a 0 or a 1, and, correspondingly, an opaque spot may represent either a 1 or a 0. A number will, of course, consist of an aggregate of these binary digits. A control order may also consist of an aggregate of binary digits. The term "word" is now well known to the art and is used to mean either a number or a control order. A line of data as stored in the data-dispensing unit may contain several words, one word or a part of a word, depending on the length of the words and the digital storage capacity of the data-dispensing device. The digital storage capacity of the data-dispensing device should be made compatible with the lateral storage capacity of the film (i. e., the number of columns or channels across the film). A reference mark is recorded with each line for use in locating the line during the transfer of the data from the film into electrical signals, i. e., during the reading process. It is convenient to use a spot width of .020″. Thus, with standard 35 mm. film, it is feasible to record in 50 channels, as well as to provide for an alignment mark if unperforated film is used. A spot normally needs to be only .010″ long in the direction of the film motion. Thus, 5000 digits or more may be recorded per inch of 35 mm. film. This is many times the storage density of other media used in the past. Also, this device can record at rates many times higher than those previously attained by other devices. Hundreds of thousands of digits can be recorded per second in practicing the invention.

In accordance with one embodiment of the invention to be described in detail, when the computing machine with which the storage device is integrated wants to record a group of words, it transfers a word to a suitable data-dispensing device of the stepping type and transmits a signal to start a sensitive film in motion. As soon as the film has moved to a proper position, as determined by a timing disc moving in synchronism with the film, a signal triggers the sweep circuit and the unblanking circuit of a cathode ray tube. A mask on the face of the tube is imaged on the sensitive film and as the beam sweeps across the mask, its vertical deflection is step-by-step controlled by the digits stepped out of the data-dispensing device to record a word in binary form on the film. This cycle is repeated until the computing machine sends out a stop-recording signal.

The invention will be better understood from the following description taken in connection with the accompanying drawings, and its scope will be pointed out in the appended claims.

In the drawings:

Fig. 9 shows another recording mask;

Fig. 10 illustrates schematically the modification of the apparatus of Fig. 4 for recording with the mask of Fig. 9;

Fig. 11 shows the form of a record made with the apparatus of Fig. 10;

Figure 1:
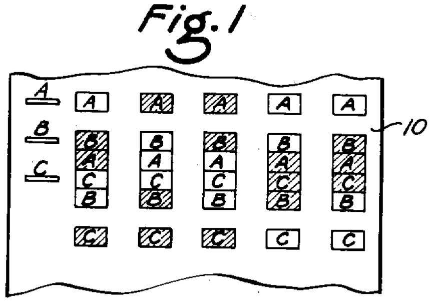
Fig. 1 shows a photographic record of three words made according to the invention.

Before describing how the digits of a word are translated from a static electric condition to a physical record, it may be helpful first to become familiar with the type of record to be made. A photographic record is preferred and one such record 10 is shown in Fig. 1, where the letters A, B and C designate three words, each of which represents a photograph of a mask 11, shown in Fig. 2, with its apertures 12 and 13 illuminated selectively in accordance with a word as follows: The vertical columns formed by the apertures 12 and 13 correspond from left to right to the sequence of the digits in the word, while the horizontal rows of apertures 12 and 12 represent t ones and zeros, respectively, of the word. Thus, if the first digit in a word is 1, the first aperture 12 will be illuminated and the first aperture 13 will remain dark. For the word 10011, the first, fourth and fifth of the apertures 12 and the second and third of the apertures 13 will be illuminated. In addition, the mask 11 is provided with an elongated slit 14 which is illuminated with each word to provide a reference area on the record 10 so that the accompanying word may be located thereon.

With the mask 11 illuminated as above described for the word 10011, called word A in Fig. 1, it will, when photographed, appear on the record film 10, as shown in Fig. 1, wherein it will be seen that the areas A constitute a reproduction of the apertures of the mask 11. It will, of course, be understood that only the apertures which were illuminated will be recorded and that the areas A which are shaded in the drawing are placed thereon to aid in visualizing the form of the recorded word. The film 10 is then advanced to record the next word B, etc. It will be noted that if the apertures 12 and 13 are spaced vertically by a distance equal to twice the height of an aperture and the film 10 is advanced this same distance between the recording of words, then the recorded words, A, B, C, etc., are interlaced to make full use of the film 10 in the direction of its advancement. Full use can also be made of the width of the film 10, but in the simple form first to be described, it is convenient to have the columns 12 and 13 spaced as shown.

Figure 3:
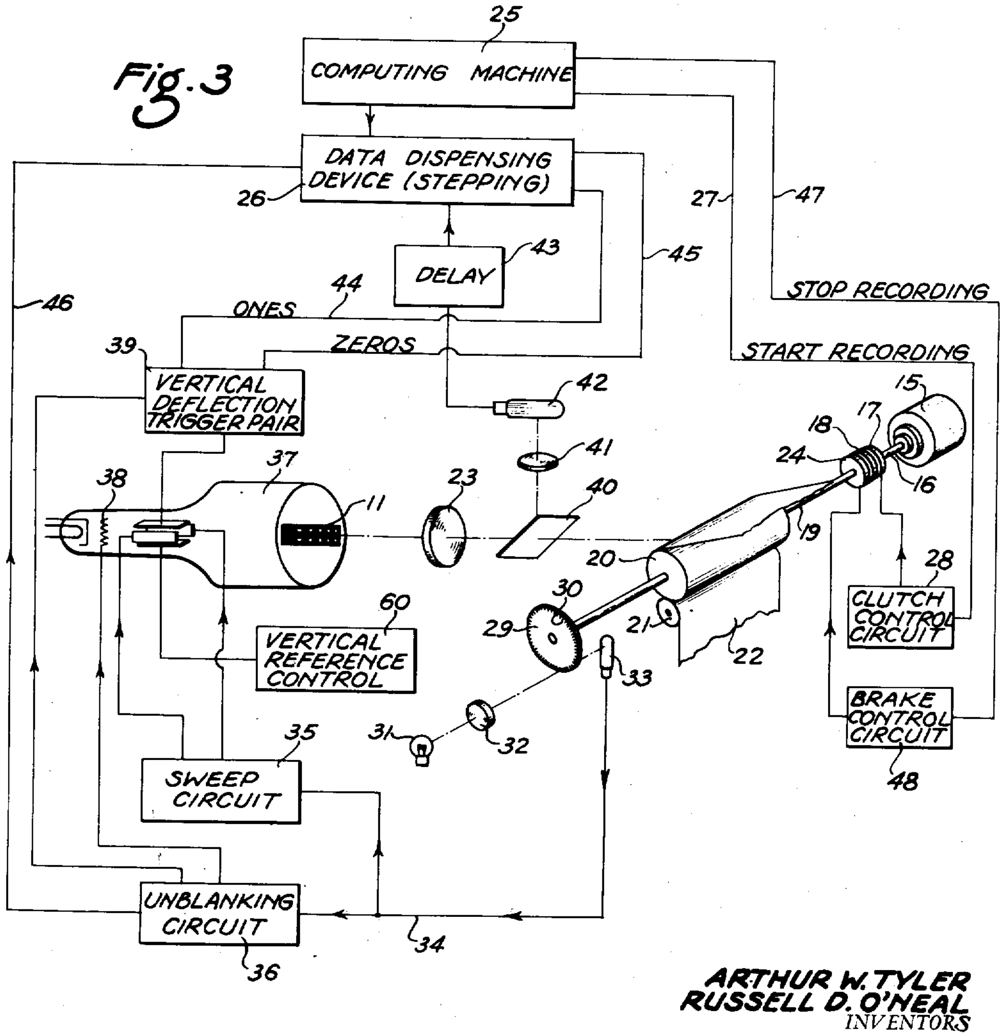
Fig. 3 is a conventionalized showing, partly in perspective, of a recording device according to the invention.

The overall operation of a recorder and its integration with a computing machine will be clear from a consideration of the functionalized machine shown in Fig. 3. In this machine, a continuously running motor 15 carries on its shaft 16 an electromagnetic member 17 which, when energized, attracts and drives a clutch disc 18 carried by the shaft 19 of a drum 20 which, in cooperation with a pressure roller 21, advances a film 22 in the image of a mask 11 formed by a suitable lens 23. Also associated with the clutch disc 18 is a stationary electromagnetic member 24 which, when energized, attracts and stops the disc 18.

When the programming of a computing machine 25 calls for a recording operation, it transfers the first number to be recorded to a data-dispensing device 26 and transmits a signal over a lead 27 to a clutch-control member 28 which energizes the rotating member 17 to attract the clutch disk 18, which substantially instantaneously starts driving the film-advancing drum 20 at full speed. When this drum 20 starts rotating, a disk 29 carried by an extension of its shaft 19 rotates with it. This disk 29 is provided near its periphery with a plurality of radial slits 30 arranged to move through a light beam formed by a lamp 31 and a lens 32. Located in this light beam and behind the disk 29 is a photoelectric cell 33 which, when the first slit 30 rotates to a position to permit light to fall on the cell 33, transmits an electrical pulse through a lead 34 to the sweep circuit 35 and the unblanking circuit 36 of a cathode ray tube 37, the face of which carries the mask 11. At the same time that the unblanking circuit 36 puts a positive pulse on the grid 38 of the tube 37, it transmits a negative pulse to a control box 39 for orienting the vertical deflection trigger pair contained therein to make certain that this trigger pair is in the condition for deflecting the cathode ray beam to what will be called its upper level, i. e., in the position to scan the apertures 12 in the mask 11. The cathode ray beam, being in the upper level when it starts its sweep, will first scan the slot 14 in the mask 11 which is recorded as a locating or timing mark on the film 22. A portion of the light transmitted by this slot 14 is directed by a transparent mirror 40 through a lens 41 onto a photoelectric cell 42 to furnish a pulse through a delay circuit 43 to the data-dispensing device 26 for stepping out the first digit of the word contained therein and to be recorded. The delay circuit 43 is employed so that this digit will not be stepped out until the cathode ray beam has had time to move to some point between the slot 14 and the first column of apertures in the mask 11. After this delay, the device 26 furnishes a pulse over wire 44, assuming the first digit is a "1," to the trigger pair 39 to set it for a vertical deflection of the cathode ray beam in the upper level, but, since the beam is already at this level, nothing happens and the beam passes behind the first aperture 12 of the mask 11. This aperture 12 is thus recorded on the film 22, and a portion of the light is again directed to the cell 42 to step out the next digit from the data-dispensing device 26. If this next digit is a zero, a pulse will be transmitted over the zero wire 45 to flip the trigger pair 39 to its other stable position at which the beam of the cathode ray tube 37 is deflected to its lower level, i. e., its vertical deflection corresponding to the level of the apertures 13 in the mask 11. The two levels provided by the trigger pair 39 are made to coincide with the apertures 12 and 13 by suitable adjustment of a reference-control circuit 60. Thus, the aperture 13, second from the left, will be illuminated and recorded on the film 22. This cycle continues throughout the horizontal sweep of the cathode ray beam, at which time the last digit will have been stepped out and recorded through its proper aperture in the mask 11. The timing of the unblanking circuit 36 is such that at the end of the sweep, the tube 37 is again blank and a pulse is transmitted over a lead 46 to the data-dispensing device 26, which causes it to accept another word from the computing machine 25. Shortly after the new word appears in the dispensing device 26, another slit 30 in the disk 29 will have come into position to energize again the photocell 33, which furnishes another pulse to repeat the above-described recording cycle. These cycles continue until the control or program of the computing machine 25 calls for an end to recording by transmitting a pulse over a lead 47 to a brake-control circuit 48, which energizes the stationary member 24 to attract and immediately stop the clutch disk 18 and therefore the film 22. The record thus formed on the film 22 will be that shown in Fig. 1 for the three words A, B and C.

Figure 3A:
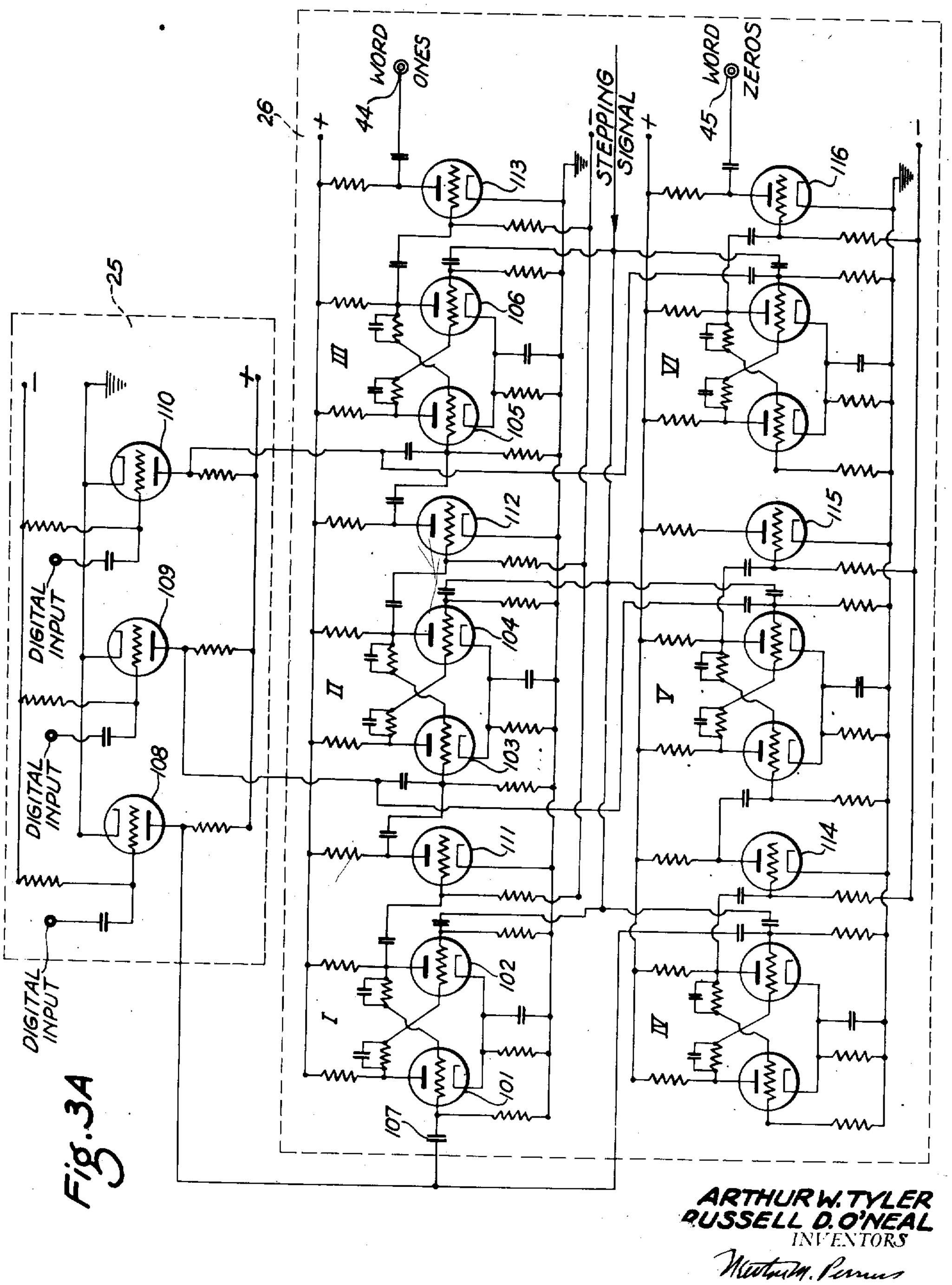
Fig. 3A is a schematic circuit diagram of a stepping register for the data-dispensing device.
Figure 4:
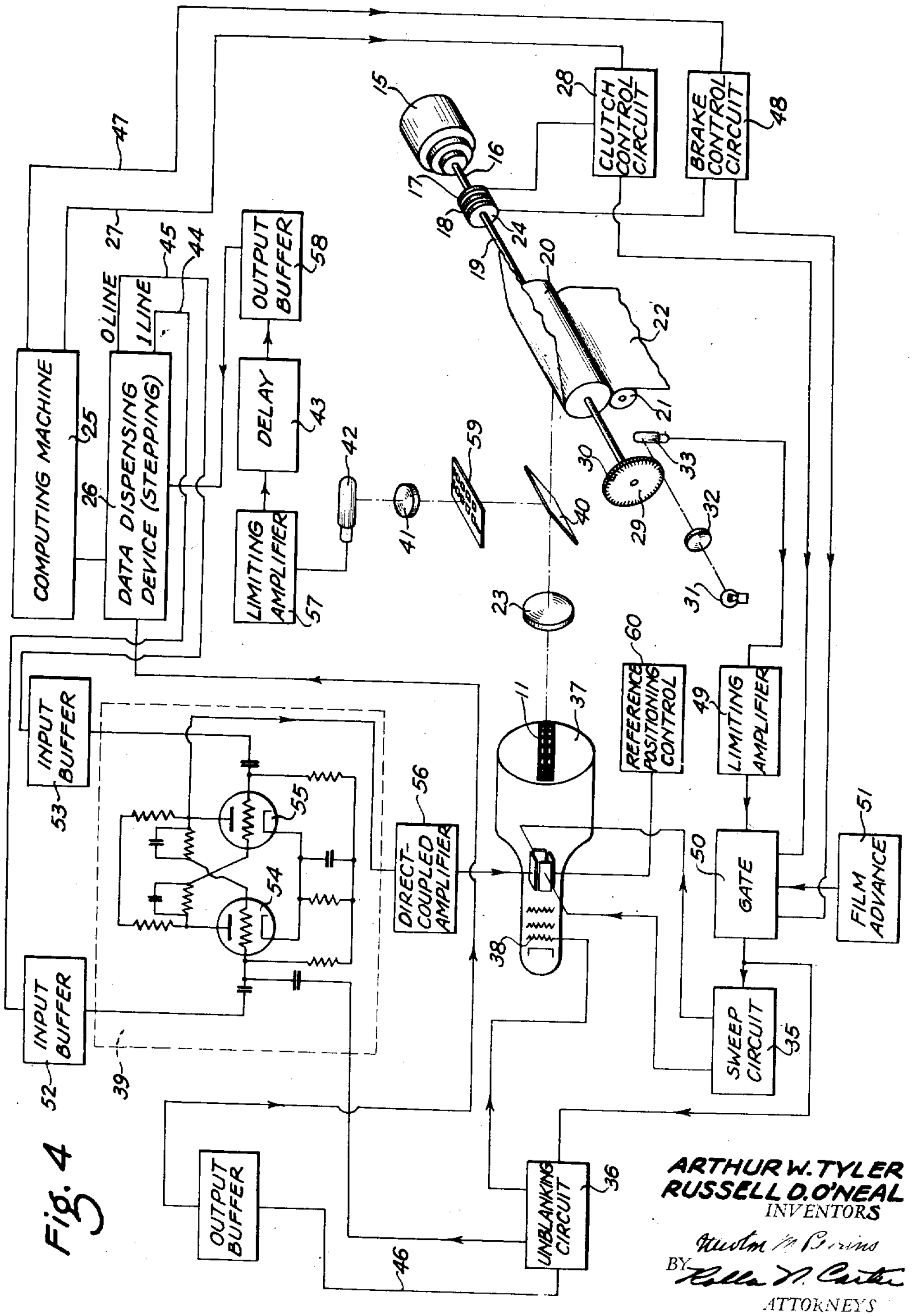
Fig. 4 is a schematic illustration of a complete apparatus similar to the device of Fig. 3.

The complete apparatus shown in Fig. 4 is functionally the same as that of Fig. 3, and like reference characters are applied to like parts in these two figures. As was the case in the apparatus of Fig. 3, the apparatus of Fig. 4 starts a recording operation by the computing machine sending an electrical pulse over wire 27. This signal triggers the clutch-control circuit 28 which, in turn, energizes the driving member 17 of the fast-acting magnetic clutch disk 18 to bring the film 22 up to speed within a few milliseconds. The clutch-control circuit 28 simultaneously opens a gate circuit 50. As the disk 29 rotates, light passes through timing slits 30 each time the film 22 has advanced enough to allow the recording of another line. When light falls on the phototube 33, the resulting electrical signal is amplified in a limiting amplifier 49 and passed by the gate circuit 50 to trigger the sweep circuit 35 and the unblanking circuit 36. The gate circuit 50 can be closed either by a signal from a manual control 51 or from the brake control 48 to permit the advancement of the film 22 without recording whenever this is necessary. When triggered, the unblanking circuit 36 will furnish a positive pulse to the grid 38 of the C. R. T. 37 to turn on the beam. The line of data to be recorded has already been transferred from the data source 25 to the data-dispensing device 26. The data-dispensing device 26 contains a storage register which is capable of stepping the data stored therein one digit at a time and furnishing as an output electrical signals representing respectively the 0 or 1 which is stepped out of the register. The basic storage elements in this register may be trigger pairs or any other well-known electronic or electrical storage device (see Fig. 3A). If the digit stepped out of the register is a 0, a signal passes out of the data-dispensing device over the 0 line 45 and correspondingly, if the digit is a 1, a signal passes out over the 1 line 44. These two lines 44 and 45 are connected through buffer amplifiers 52 and 53, respectively, which both isolate the data-dispensing device 26 from the vertical positioning circuit 39 and do any necessary shaping of the signals, to the grids of the two tubes 54 and 55 making up a trigger pair. Thus, if the digit is a 0, the tube 54 will be made to conduct, and if the digit is a 1, the other tube 55 will be made to conduct. An amplifier 56 whose input is directly coupled to the output of the tube 55 of the trigger pair tubes and whose output is directly connected to one of the vertical deflection plates of the C. R. T. 37 positions the beam vertically in one of two levels, depending upon whether the digit to be recorded is a 0 or a 1. Either of the leads 44 and 45 may be dispensed with by using the remaining lead to transmit negative or positive pulses representative of the two digits.

Figure 2:
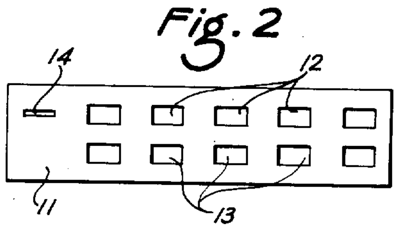
Fig. 2 shows a mask employed in making the record of Fig. 1.

The line of data in the data-dispensing device is photographed on the film in sequence as the digits are stepped out into the vertical positioning circuit 39 in synchronism with the lateral position of the beam in a manner to be described below. In order to obtain well-defined spots for each digit, a mask 11 is used over the face of the C. R. T. The beam is focused so that it is somewhat larger than the vertical length of a mask opening. The beam then has considerable extension in the horizontal direction so that succeeding digits cannot in practice be stored side by side in adjacent columns. Therefore, to give good definition to the spot in the lateral direction, every other column is blanked out by the mask as shown in Figs. 1 and 2. It will be seen below that the corresponding space on the film is not necessarily wasted.

At the beginning of the sweep, a negative pulse is furnished by the unblanking circuit 36 to the grid of the tube 54 of the vertical positioning trigger pair tubes to orient the trigger pair so that the beam passes behind the reference slot opening in the mask, i. e., the upper level. The light passing through the mask is imaged by the lens 23 onto the film 22 as it passes over the drum 20. Thus, a reference mark is recorded on the film. At the same time, part of the light from the cathode ray tube is reflected by the beam splitter 40 to the monitoring phototube 42. The signal from this phototube 42 is amplified by a limiting amplifier 57 and then delayed in the delay circuit 43 for a time sufficient to permit the C. R. T. beam to completely pass behind the slot in the mask. The signal then passes through a buffer amplifier 58 which both isolates the delay circuit 43 from the data-dispensing device 26 and shapes the output signal to the data-dispensing device 26 which steps and furnishes an electrical signal, representing the first digit, to the vertical positioning circuit 39. As described above, this circuit 39 positions the beam in one of two positions, depending upon whether the digit is a 0 or a 1. This positioning is accomplished while the beam is behind the blanked-out portion of the mask 11 so that when the beam emerges into the next lateral opening of the mask, it is properly positioned vertically. While this first digit is being recorded, another phototube signal is generated and delayed as before to cause the second digit to be stepped out of the data-dispensing device 26 into the vertical positioning circuit 39. The positioning of the beam for recording the second digit again takes place behind the blanked-out portion of the mask 11. Thus, the process continues until the entire line has been removed from the data-dispensing device 26 and recorded onto the film 22. Shortly thereafter the unblanking pulse and the sweep are completed. The unblanking pulse is differentiated and the resulting pulse is sent to the control circuit in the data-dispensing device 26 so that any desired check operation can be initiated and the storage register can be cleared for the acceptance of another line of data from the data source.

Part of the delay between the time when the beam starts to move across an aperture in the mask 11 to record a digit and the time when the next digit is stepped out of the data-dispensing device 26 may be effected by having a mask 59 which is in the same plane as the image of the mask 11. This mask 59 is adjusted so that the light in the image cannot get through to the photocell until the beam has traversed most of the particular opening. Then a small amount of electrical delay may be added by the delay circuit 43 to permit the C. R. T. beam to completely traverse the opening. Using the mask 59 to obtain part of the delay has the advantage that variations in sweep speed across the sweep do not have much effect on the timing of the vertical positioning.

The data-dispensing device 26 may take any of numerous forms, and for the purpose of this disclosure a three-digit stepping storage register is shown in Fig. 3A. It will be noted in Fig. 3A that the leads 44 and 45 over which signals representing ones and zeros were conveyed from the dispensing device 26 to the vertical deflection trigger pair 39 in Figs. 3 and 4 comprise the outputs of two similar storage registers, one of which stores a word and the other stores the invert. The word is stored in three identical trigger circuits I, II and III having, respectively, triodes 101 and 102, 103 and 104, and 105 and 106, cross-connected in a well-known manner so as to have two stable conditions in which one or the other of the tubes in the trigger circuit is conducting. The grid of the first triode 101 is connected to the anode of the second triode 102 through a suitable impedance network and the anode of the triode 101 is connected to the grid of the triode 102 through a similar network. Thus, a negative pulse on the grid of either of the triodes 101 and 102 will cut it off and make certain that the other conducts, and the same argument applies to the other two trigger circuits II and III. The grid of the first tube 101 in the trigger circuit I is connected through a coupling capacitor 107 to the anode of a triode 108 in the computing machine 25. Triodes 109 and 110 are similarly connected to the grids of the first tubes 103 and 105, respectively, in the trigger circuits II and III. The grids of these tubes 108, 109 and 110 are connected to sources of digital input within the computer 25 and to a source of negative bias potential.

In operation, if it is assumed that initially the buffer tubes 108, 109 and 110 are not conducting and the trigger circuits are in the binary zero condition, i. e., the tubes 101, 103 and 105 are conducting, a positive pulse representing a 1 applied to the grid of the buffer tube 108 will by normal phase inversion appear on the anode normal phase inversion appear on the anode thereof as a negative pulse which is applied through the coupling capacitor 107 to the grid of the first tube 101 to render the tube 101 non-conducting. Thus, the anode of the tube 101 becomes more positive and a positive pulse will be applied to the grid of the tube 102 causing the tube 102 to become conducting thereby placing the trigger circuit I in the binary 1 condition. If the digital input to the buffer tube 108 had been a negative pulse, or no pulse, representing a zero, the tube 108 would have remained cut off and the trigger circuit I would have remained in the binary zero condition. The same type of action takes place for the digital inputs to the buffer tubes 109 and 110 and if these inputs correspond, respectively, to a zero and a 1, then the trigger tube 103 remains conducting and the trigger tube 106 becomes conducting. Thus, the trigger circuit I is in the binary 1 condition, the trigger circuit II is in the binary zero condition, and the trigger circuit III is in the binary 1 condition so that the number or word 101 has been transferred in parallel from the computing machine 25 to the storage register of the data-dispensing device 26.

The storage register for the invert comprises three trigger circuits IV, V and VI identical with the trigger circuits I, II and III but oppositely connected to the buffer tubes 108, 109 and 110 so that they are oppositely affected by the output pulses of the buffer tubes 108, 109 and 110. Thus, with the trigger circuits I, II and III initially in the binary zero condition and with the trigger circuits IV, V and VI initially in the binary 1 condition, the pulses which transferred the word 101 to the trigger circuits I, II and III also transferred the invert 010 to the trigger circuits IV, V and VI so that the right-hand tubes of the trigger circuits I, III and V are conducting, and the right-hand tubes of the trigger circuits II, IV and VI are non-conducting.

It will be seen in Fig. 3A that the anodes of the right-hand tubes of the six trigger circuits are coupled, respectively, to the grids of transfer amplifier tubes 111, 112, 113, 114, 115 and 116, and that each of these transfer amplifier tubes is normally biased to cut off by having its grid connected to a suitable source of negative potential. The anode of the transfer tube 111 is coupled to the grid of the tube 103, the anode of the transfer tube 112 is coupled to the grid of the tube 105, and the anode of the transfer tube 113 is coupled to the one line 44 leading to deflecting trigger pair 39 of Fig. 3. The trigger circuits IV, V and VI are similarly coupled in series to the zero line 45 leading to the deflecting trigger pair 39.

It will also be seen in Fig. 3A that stepping signals coming from the monitoring photocell 42 of Fig. 3 are applied simultaneously to the grid of the right-hand tube in all six trigger circuits comprising the storage register. Assuming that the word 101 and its invert are in the storage device as above described, the negative pulse comprising the first stepping signal applied to the grid of the tube 106, which is conducting, will cut off the tube 106 which returns the trigger circuit III to binary zero condition and furnishes a positive pulse to the grid of the transfer tube 113. Due to normal phase inversion in the transfer tube 113, a negative pulse will be derived from the anode thereof and supplied to the line 44 to orient the vertical deflection trigger pair 39 for recording a 1 as described in connection with Fig. 3. The first stepping signal pulse is also applied to the grid of the tube 104, but since this tube 104 is not conducting, nothing happens and the trigger circuit II remains in the binary zero condition. Since the stepping pulse left the trigger circuit III in the binary zero condition, the zero stored in the trigger circuit II has effectively been stepped to the trigger circuit III. The first stepping signal pulse is also applied to the grid of the tube 102 which, being conducting, is cut off, thereby returning the trigger circuit I to the binary zero condition and applying a positive pulse to the transfer tube 111. This, in turn, furnishes the grid of the tube 103 with a negative pulse, and since the tube 103 is now conducting, it is cut off and the trigger circuit II assumes the binary 1 condition. Thus, the digit 1 which was stored in the trigger circuit I has been shifted to the trigger circuit II. It will be evident that if two adjacent trigger circuits, e. g., I and II, in the binary 1 condition receive a stepping pulse, the transfer pulse from the tube 111 must somehow be delayed long enough to permit the trigger circuit II to reach sufficient equilibrium to be again tripped. In the present circuit, this delay results from the relatively slow rate of increase of the positive pulse on the anode of the tube 102 and the fact that the transfer tube 111 is biased to cut off.

The operation above described, whereby a stepping signal pulse shifts each stored digit one digital position to the right, is repeated for each stepping signal so that the stored digits are stepped out of the register and onto lead 44 in sequence. The stepping signals function in the same way to furnish in sequence to the zero lead 45 the invert digits stored in the trigger circuits IV, V and VI. When it is remembered that whenever a word 1 is furnished the lead 44, an invert zero is furnished the lead 45, and vice versa, it will be obvious that the ones in a word will appear as pulses on the lead 44, and the zeros in the word will appear as pulses on the lead 45. Only three circuits are illustrated, but it will be understood that as many such circuits as required may be connected together to handle the number of digits desired. Obviously, the same applies to the mask employed on the cathode ray tube, and as many apertures will be provided therein as are necessary to indicate the number of digits found convenient. As stated above, words of fifty digits are preferred when 35 mm. film is used for the storage medium.

Referring again to Figs. 1 and 2, it will be noted that the record made through the row of apertures 12 is a complete representation of a word and also that the record made through the apertures 13 is a complete representation of the same word albeit the two representations are exactly opposite to one another. If the first representation, upper line A in Fig. 1, is the word, then the other representation, lower line A, is called the invert, which term as used herein means the word with the zeros and ones interchanged. Thus if the word is 10011, its invert is 01100.

The recording of both the word and the invert makes it possible to check the recording process as it takes place and, although not here described, it also facilitates checking in the reading operation. The modification of the apparatus of Fig. 4 needed for checking the recording operation is relatively simple and is shown schematically in Fig. 5. Since the only changes are in the data-dispensing device and the monitoring system, the film drive and the cathode ray tube and their associated circuits are shown in blocks with the understanding that their organization may be that of Fig. 4.

Figure 5:
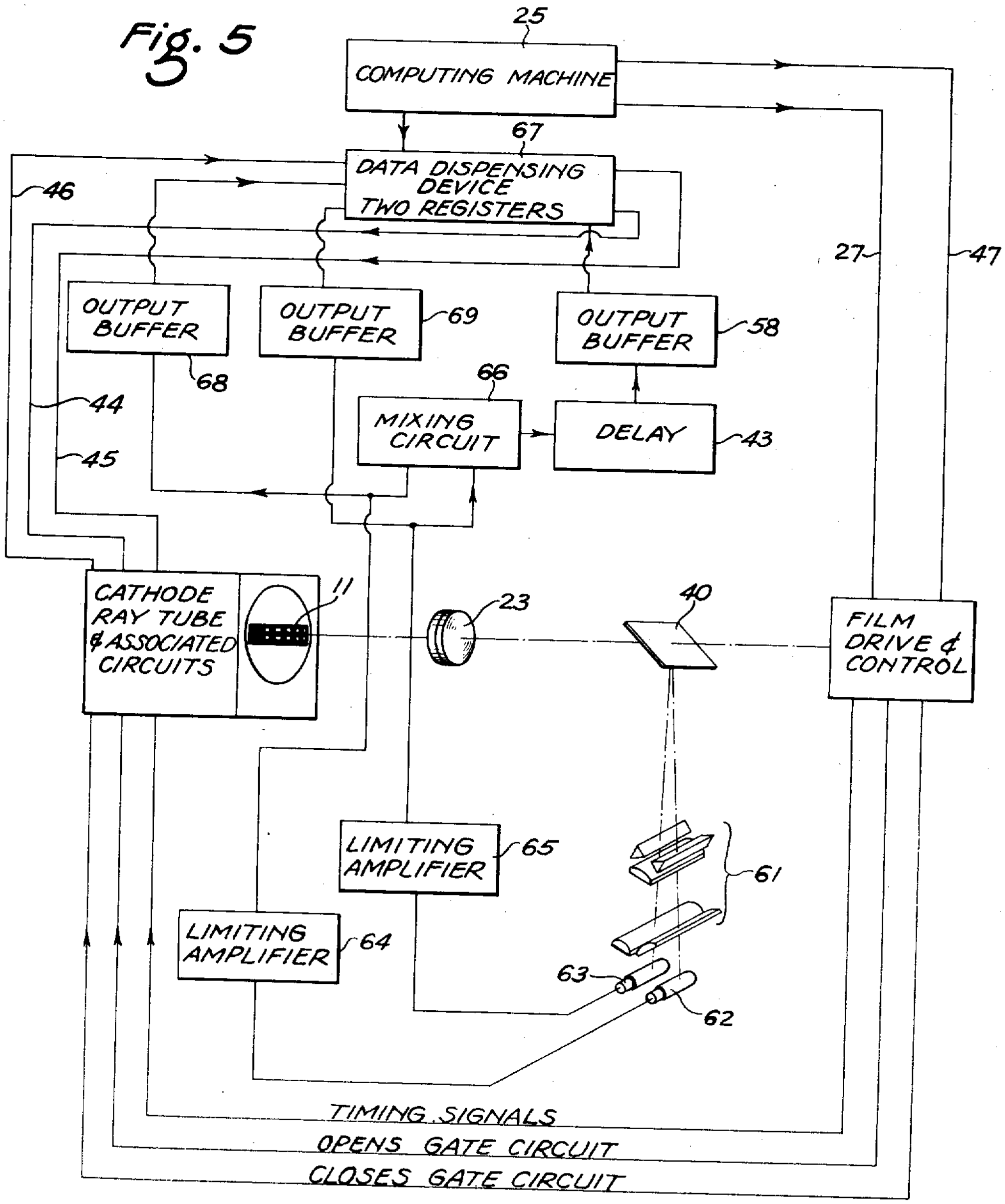
Fig. 5 is a schematic illustration of the apparatus of Fig. 4 modified for checking a recording.

Referring now to Fig. 5, as before, a portion of the image bearing light transmitted by the lens 23 is deflected by the beam splitter 40 for monitoring purposes. This monitoring light is separated by a suitable optical system 61 so that light from the upper row of apertures in the mask 11, i. e., the word, is directed to a photocell 62 while the light from the lower row of apertures, i. e., the invert, is directed to another photocell 63. The separate signals from the two cells 62 and 63 are fed through amplifiers 64 and 65, respectively, to a conventional mixing circuit 66 to form pulses which, after passage through the delay circuit 43 and the buffer 58, serve to step the digits out of the dispensing device 67, as was the case with the apparatus of Fig. 4. The data-dispensing device 67 differs from the device 26 of Fig. 4 by being provided with two storage registers, one of which retains the line of data, whereas the other steps the data out for recording purposes as signalled by the pulses coming from the buffer 58.

As the digits are stepped out of the dispensing device 67 over the wires 44 and 45, the corresponding digits, as read by the monitoring cells 62 and 63, are fed back into the empty digital places of the register as follows: When a one is stepped out over line 44 an aperture in the upper level or row of the mask 11 is illuminated, and this light exposes the film and energizes the cell 62 to produce a stepping pulse, as above described. A part of this pulse is passed through a buffer 68 and into the opposite side of the stepping register in the dispensing device 67. Similarly, when a zero is stepped out of the device 67 and recorded, the cell 63 is energized and a portion of the resulting pulse is passed through a buffer 69 to set up a zero in the digital place in the register rendered empty by the last stepping action. Therefore, at the completion of the recording of a word, the stepping register contains the word as read by the monitoring cells 62 and 63. At this time the data or words in the two registers can be compared in any well-known manner, and if there is agreement, the recording is assumed to be correct.

Thus far only one form of record and one form of mask for the cathode ray tube have been described, viz., the record of Fig. 1 and the mask of Fig. 2. There are a number of ways in which the data can be distributed on the film so that it can be read easily, and several possibilities will now be described.

Figure 6:
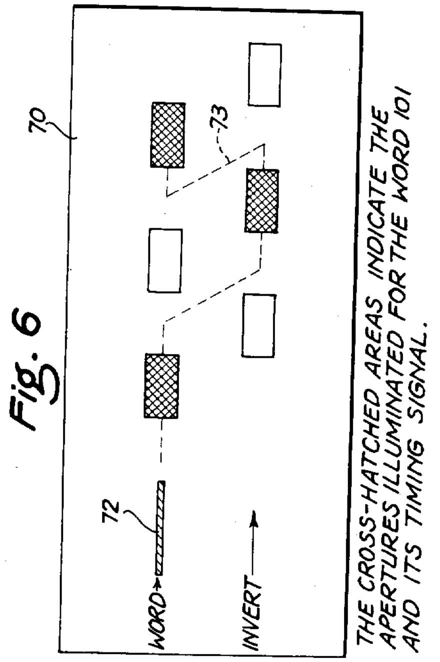
Fig. 6 shows a different recording mask.
Figure 7:
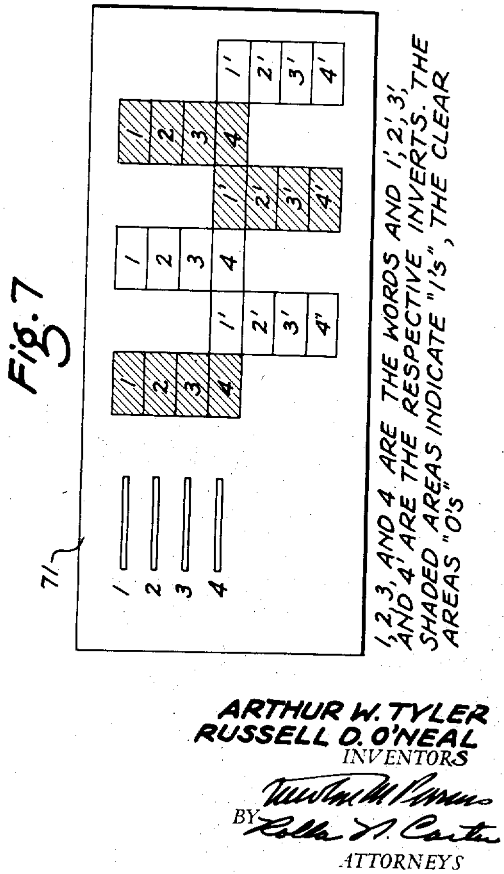
Fig. 7 shows the form of a record made with the mask of Fig. 6.

A mask 70 as shown in Fig. 6 will provide a record on a film 71 as shown in Fig. 7. In this mask 70 the word apertures and the invert apertures occupy alternate vertical columns, a timing aperture 72 being on the same level as th word apertures. The distribution on the film 7 of four identical recordings of the word 101 an it invert is shown in Fig. 7 where the shade areas represent ones and the clear areas zero All these areas are labeled to make apparent th words and inverts they represent. The broke line 73 shows the path of the scanning beam fo recording the word 101.

Figure 8:
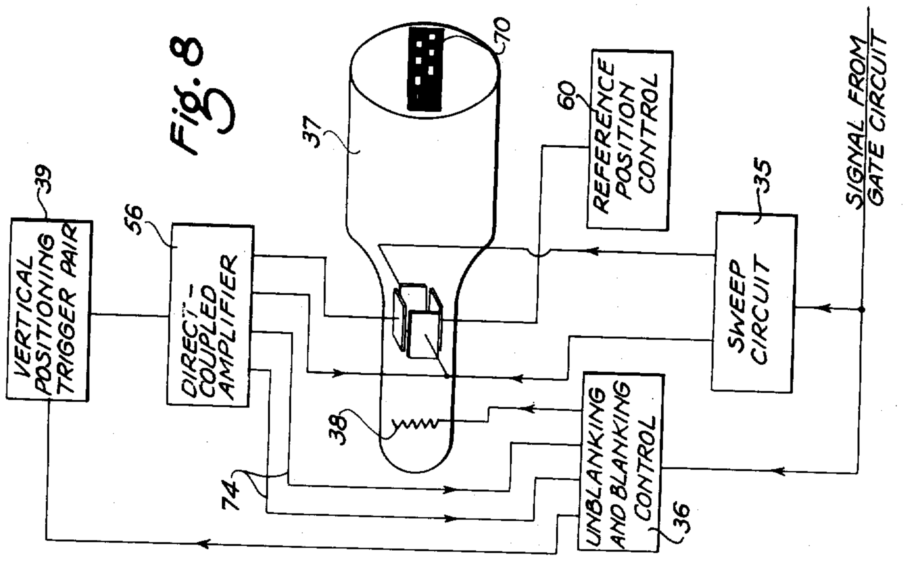
Fig. 8 shows a portion of the apparatus of Fig. 4 as modified for recording with the mask of Fig. 6.

It will be noted from Fig. 6 that each time zero is to be recorded after a one, the scannin beam is moved rapidly forward as well as dow and that each time a one is to be recorded afte a zero, the beam is moved back as well as u This back-and-forth scanning motion may b accomplished by connecting the amplifier 56 t one of the horizontal deflecting plates of th cathode ray tube 37 so that, as the orientatio of the trigger pair 39 changes, both the hor zontal and vertical deflection voltages change a cordingly. This arrangement and the way th control circuit of the cathode ray tube 37 diffe from that of Fig. 4 are shown in Fig. 8. It ma be desirable to blank the tube 37 during the ve tical deflection time to prevent possible recor ing in a wrong area and the generation of u wanted pulses in the monitoring photocell Such blanking may be accomplished by furnis ing through leads 74 a pulse to the blanking ci cuit 35 from the amplifier 56 every time a chan in orientation of the trigger pair 39 occurs.

Another system of recording words and the inverts is illustrated in Figs. 9, 10 and 11. this system a mask 75 is used in which successi apertures of both the word and the invert alte nate on two levels whereby no horizontal spaci between successive apertures is required as Fig. 2. The scanning pattern indicated broken line 76 is obtained by a simple modific tion of the reference control circuit 60 of Figs. 4 or 5 as shown in Fig. 10. All that is necessa is to replace the vertical reference control with a trigger pair 77 connected to receive t stepping signals so that their orientation changed by each succeeding stepping signal, i. the operating condition of the pair is revers for each digit that is stepped out for recordi By reference to Fig. 10 it will be apparent th each negative pulse constituting a stepping sign is applied to the grids of both the tubes 78 a 79 comprising the trigger pair 77 to change th orientation for each signal received. In or to make certain that the trigger pair 77 is proper orientation to start the sweep of t cathode ray at the level of the reference apert 80 in the mask 75, the negative pulse from t unblanking circuit 36 employed for initia orienting the trigger pair 39 is also applied the grid of tube 78 to render it nonconducti and the tube 79 conducting. The output of t trigger pair 77 is fed to the input circuit of direct coupled amplifier 81 including a tube so that when the tube 79 is conducting, t amplifier tube 82 is nonconducting and a pre termined positive potential is applied to the lo vertical deflecting plate of the cathode ray t 37. Thus at the start of the sweep under t control of the sweep circuit 36, the unblanki circuit 35 furnishes a positive pulse to the g 38 to establish the cathode ray and furnishe negative pulse to the two trigger pairs 39 and to establish the vertical position of the ray the level of the reference aperture 80 in mask 75. The stepping signal derived from the light transmitted by the aperture 80 is delayed as before to give the scanning ray sufficient time to reach the trailing edge of the aperture 80 and then applied to the grids of the tubes 78 and 79 to change their orientation and thereby render the amplifier tube 82 conducting and the potential of the lower deflecting plate less positive.

It is thus seen that the lower trigger pair 77 deflects the scanning beam to either of two levels, and the upper trigger pair 39 furnishes to the upper deflection plate a voltage having one of two values, depending upon whether the digit to be recorded is a one or a zero to make possible four vertical positions of the scanning beam. The path of the scanning beam between the apertures of the mask 75 in recording the word 100110 is indicated by the broken line 76 in Fig. 9. The distribution on a film 83 of six words recorded with the aid of the mask 75 is shown in Fig. 11 which shows that, except for the beginning and end of a series of recorded words, full use is made of the film surface.

It will be noted from Figs. 9 and 10 that changes in the vertical deflection of the cathode ray occur before the ray completely passes an aperture and that inasmuch as there is no lateral spacing between adjacent columns of apertures, the possibility exists, unless the vertical deflection is extremely rapid, that the monitoring phototube will generate improper stepping or checking pulses. This possibility may be eliminated by lowering the frequency response of the monitoring cell and associated amplifier circuit, blanking the ray during vertical deflection, or, positioning a suitable mask at an image plane in front of the monitoring cell as in Fig. 4.

Figure 12:
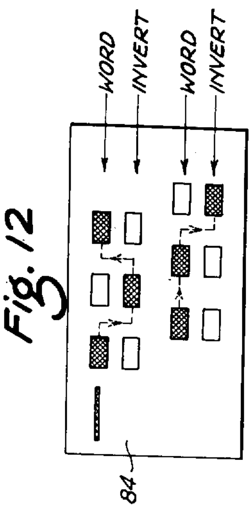
Fig. 12 shows still another form of recording mask.
Figure 13:
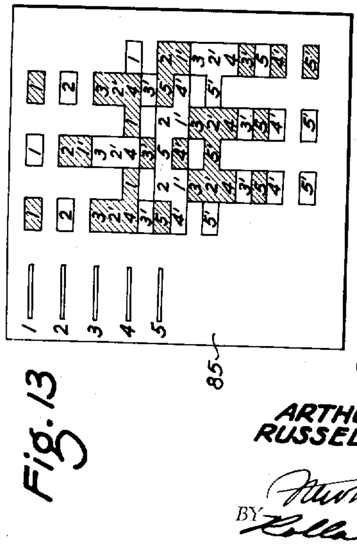
Fig. 13 shows a record made with the mask of Fig. 12.

The arrangement just described has the very important advantage of recording by a single sweep of the cathode ray twice as many digits as were recorded by a single sweep in the arrangements previously described. In the arrangement now to be described in connection with Figs. 12, 13 and 14, two sweeps are used to record a word using a mask 84 having two sets of apertures arranged in alternate columns, the digits of the first half of the word being recorded with one sweep through apertures in columns $C_1$, $C_2$, $C_3$, etc., and the digits of the second half of the word being recorded with a second sweep through the apertures in columns $C_1'$, $C_2'$, $C_3'$, etc. The distribution of five words recorded on a film 85 with the mask 84 is shown in Fig. 13.

Figure 14:
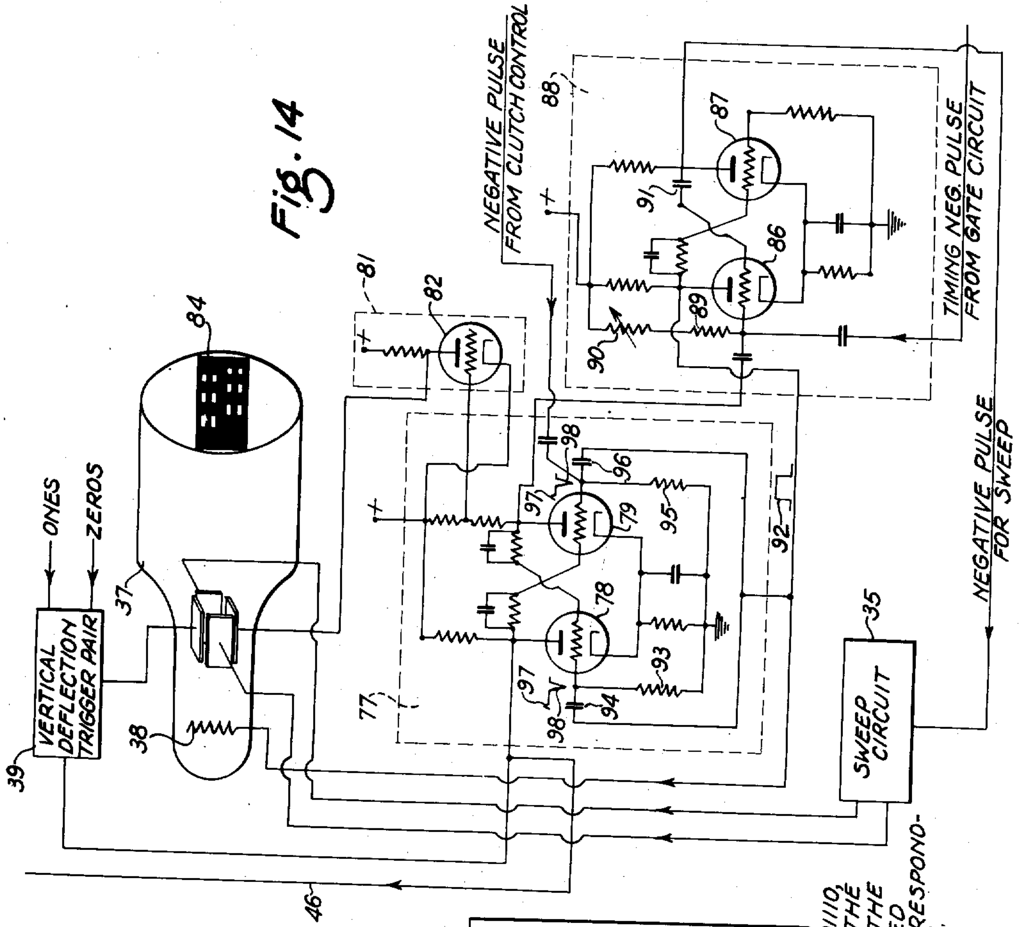
Fig. 14 is a schematic illustration of circuit modifications for recording with the mask of Fig. 12.

A circuit arrangement suitable for recording with the mask 84 on the face of the cathode ray tube 37 is shown schematically in Fig. 14. As before, the trigger pair 39 deflects the cathode ray to either of two vertical levels in accordance with the receipt of signals representing zeros or ones and the lower trigger pair 77 determines the vertical level of the ray so that successive sweeps coincide with the proper set of apertures in the mask 84. The trigger pair 77 does this by changing orientation after every sweep instead of after each digit as in the arrangement last described above. At the beginning of a recording operation the negative pulse from the clutch control circuit which opens the gate circuit is applied to the grid of the tube 79 of the trigger pair 77 to render this tube 79 nonconducting, whereby the amplifier tube 82 conducts to apply a negative potential to the lower deflection plate of the cathode ray tube 37. The negative timing pulse from the gate circuit is here applied to the grid of a tube 86 which with a tube 87 and their associated circuits form a lopsided multivibrator constituting an unblanking circuit 88. This negative pulse renders the tube 86 nonconducting and the tube 87 conducting for an interval of time determined by the values of resistances 89 and 90 and a condenser 91 to correspond to the interval required for a single sweep. A negative pulse appearing on the anode of the tube 87 when it started to conduct is applied to the sweep circuit 35 to initiate a sweep operation. When the tube 86 becomes nonconducting, the resulting positive pulse 92 from the anode of the tube 86 is furnished to the intensity grid 38 of the cathode ray tube 37 to unblank its beam. This positive pulse 92 is also furnished to the grid circuits of the trigger pair tubes 78 and 79, including a resistance 93 and a condenser 94 and a resistance 95 and a condenser 96, respectively, which differentiates the pulse 92 to derive an initial small positive pulse 97 and a terminal negative pulse 98 separated by the width of the pulse 92. The small positive pulse 97 has no effect on the trigger pair 77, but the negative pulse 98 triggers the pair 77 so that the tube 78 becomes nonconducting and the tube 79 conducting. This polarity discrimination is inherent in the circuit and is, of course, enhanced by the positive pulse 97 being of lesser amplitude than the negative pulse 98.

The cut-off of the tube 78 by the negative pulse 98, which coincided with the completion of the sweep of the cathode ray in its upper level and with the termination of the unblanking pulse 92, caused the tube 79 to conduct, and hence the amplifier tube 82 cuts off to provide on the lower deflection plate of the cathode ray tube 37 a positive potential corresponding to the lower level for the cathode ray. The pulse from the anode of the tube 79 which cut off the amplifier tube 82 is also applied to the grid of the multivibrator tube 86 to cut it off as did the timing pulse and to produce another unblanking pulse 92. This makes the tube 87 conduct, which action furnishes a pulse to the sweep circuit 35 to start another sweep of the cathode ray, this sweep being in the lower level due to the amplifier tube 82 being cut off. At the end of the unblanking pulse 92, the negative pulses 98 applied to the grids of the trigger pair tubes 78 and 79 resets the trigger pair 77 by cutting off the tube 79 so that the trigger pair 77 is in condition to record in the upper level when the next timing pulse is received from the gate circuit. When the tube 79 became nonconducting, the tube 78 became conducting, causing a negative pulse to appear on its anode. This negative pulse is furnished to the trigger pair 39 and also constitutes a completion signal on the wire 46 which goes to the data-dispensing device 26 as described in connection with Fig. 4.

The recording arrangement described in connection with Figs. 12, 13 and 14 has the advantages of allowing the digital deflections to take place at a relatively slow speed and entirely behind non-apertured portions of the mask 84, and of recording a long line of data with only one timing or alignment slot. It has the disadvantage of requiring more recording time for the same amount of data, which means that the recording film will move farther during the recording of a single line of data, and unless correction is made for the film motion, the recording will be more slanted across the film. This latter difficulty can be overcome by providing an alignment aperture for the apertures in the lower level of the mask 84 and advancing the film between each sweep.

When it is desirable to record only the word and not the invert, it is simply necessary to shield the recording film from light coming from the zero position of the cathode ray beam while permitting light from both the one position and the zero position to fall on the monitoring photocell so that stepping pulses will be generated for each digital position. Obviously, when only the word is recorded, twice as much data can be stored on the same film area as when both the word and the invert are recorded.

Thus, the invention described comprises an apparatus to which binary digital electric signals representing a word are fed in denominational sequence. That is, the value of each digit is represented by a characteristic of an electric signal and the signals are fed in the order of the denominations of the digits. These signals are employed to control the vertical deflection of a cathode ray beam as it courses a horizontal scanning sweep to provide luminous areas in binary abacus form, i. e., successive areas at either of two levels according to the value at that denomination. The word is recorded simply by photographing the pattern formed by the luminous areas. Such photographs may, of course, be either negatives or positives since their primary prerequisite is to provide a record in which a word is represented by a proper distribution of areas having unique light-modifying characteristics.

The various functions and operations performed by the apparatus are not dependent upon the particular devices described. For instance, the mask for the cathode ray tube may be replaced with any suitable arrangement for establishing the desired pattern, such as by distributing the fluorescent coating in patches to form a mosaic. Thus it will be understood that the invention is not to be limited to the particular instrumentalities described for the purpose of making the invention readily understood, but that many modifications may be made without departing from the scope of the invention as indicated in the appended claims.

We claim:

1. A digital data recording system for utilizing digit-representing electric signals received in denominational sequence, comprising a circuit responsive to the received signals for deriving control potentials characteristic of the digits represented by said signals, a plurality of apertures arranged in linear rows in which each row corresponds to a digit value, means for illuminating in succession aperture after aperture in the direction of the rows, means governed by the derived control potentials for selecting for each denominational signal the row in which an aperture is illuminated, and means for photographing the apertures.

2. A recording device for the storage of binary digital data received in the form of electrical pulses representative of binary ones and zeros comprising a cathode ray tube having ray-generating means, ray-deflecting means and a fluorescent screen in the path of said ray, a sweep circuit for producing a horizontal sweeping deflection of said ray, a trigger pair circuit having two stable conditions for setting the vertical deflection of said ray at either of two values depending upon which stable condition exists in said trigger circuit, means for applying the received electrical pulses to said trigger circuit so that it is stabilized in one condition by pulses representative of ones and in the other condition by pulses representative of zeros, and means for photographing the position of said ray as determined by each received pulse.

3. In combination, a device actuatable by electric impulses for dispensing in sequence binary-data-representing signals, means movable for advancing a photographic film and for providing an electric signal for each predetermined unit of movement, a cathode ray tube having a face and having unblanking and sweep circuits responsive to each electric signal for producing a single horizontal excursion of a cathode ray beam across the face of said tube within the time interval required for each unit of movement of said movable means, a mask on the face of said tube having a reference aperture and two horizontally extending rows of apertures, the reference aperture being in horizontal alinement with one of said rows of apertures, means including a circuit having two stable conditions for deflecting said beam vertically to the levels, respectively, of the two rows of apertures, means for applying the data-representing signals to the last-mentioned circuit for establishing in succession the stable condition corresponding to the data represented by each such signal, means operated by said electric signal for orienting said last-mentioned circuit to the condition where said beam is deflected to the level of the reference aperture, means associated with each aperture for translating said beam into light, means responsive to light from the apertures for supplying electric impulses to said device, and means for imaging said mask on the photographic film.

4. Apparatus for recording digital data received from a device actuatable by electric impulses to dispense in sequence data-representing signals, comprising a recording station having means movable for positioning a photographic film therein and for providing an electric signal, means including a cathode ray tube operative in response to the electric signal for producing a horizontal sweep of a cathode ray, means for rendering the cathode ray luminous at positions spaced vertically and along its sweep, means for imaging the luminous positions on the film at the recording station, means responsive to light from each luminous position for deriving an electric impulse to actuate said device to dispense a data-representing signal, and means controlled by each data-representing signal for determining the vertical location of the next position to be made luminous.

ARTHUR W. TYLER.
RUSSELL D. O'NEAL.

REFERENCES CITED

The following references are of record in the file of this patent:

UNITED STATES PATENTS

| Number | Name | Date |
|---|---|---|
| 2,091,152 | Malpica | Aug. 24, 1937 |
| 2,267,827 | Hubbard | Dec. 30, 1941 |
| 2,283,383 | McNaney | May 19, 1942 |
| 2,301,199 | Bruce et al. | Nov. 10, 1942 |
| 2,369,783 | Homrighous | Feb. 20, 1945 |
| 2,402,058 | Loughren | June 11, 1946 |
| 2,425,003 | Potter | Aug. 5, 1947 |
| 2,428,369 | Kammer | Oct. 7, 1947 |
| 2,480,636 | Dieke | Aug. 30, 1949 |